United States Patent
Gilmartin

(10) Patent No.: US 12,211,050 B2
(45) Date of Patent: Jan. 28, 2025

(54) CANARY CARD IDENTIFIERS FOR REAL-TIME USAGE ALERTS

(71) Applicant: Brex Inc., Draper, UT (US)

(72) Inventor: Daniel Gilmartin, Morristown, NJ (US)

(73) Assignee: Brex Inc., New York, NY (US)

( * ) Notice: Subject to any disclaimer, the term of this patent is extended or adjusted under 35 U.S.C. 154(b) by 90 days.

(21) Appl. No.: 17/560,016

(22) Filed: Dec. 22, 2021

(65) Prior Publication Data

US 2023/0196371 A1    Jun. 22, 2023

(51) Int. Cl.
*G06Q 20/34*    (2012.01)
*G06Q 20/40*    (2012.01)

(52) U.S. Cl.
CPC ......... *G06Q 20/4016* (2013.01); *G06Q 20/34* (2013.01)

(58) Field of Classification Search
None
See application file for complete search history.

(56) References Cited

U.S. PATENT DOCUMENTS

| | | | | |
|---|---|---|---|---|
| 11,334,887 B2* | 5/2022 | Kochura | .............. | G06Q 20/227 |
| 2002/0099649 A1 | 7/2002 | Lee et al. | | |
| 2006/0018466 A1* | 1/2006 | Adelstein | ............ | H04L 63/1425 380/46 |
| 2008/0214166 A1 | 9/2008 | Ramer et al. | | |
| 2011/0307382 A1* | 12/2011 | Siegel | .................... | G06Q 20/04 705/44 |
| 2012/0179563 A1 | 7/2012 | Soroca et al. | | |
| 2015/0254661 A1 | 9/2015 | Lanc | | |
| 2015/0269562 A1* | 9/2015 | Wang | ................... | G06Q 20/354 705/41 |
| 2018/0374071 A1* | 12/2018 | Israeli | .................. | G07G 1/0009 |
| 2019/0065784 A1* | 2/2019 | Margalit | ............. | H04L 63/1416 |

* cited by examiner

*Primary Examiner* — William J Jacob
(74) *Attorney, Agent, or Firm* — Perkins Coie LLP

(57) ABSTRACT

There are provided systems and methods for canary card identifiers for real-time usage alerts. A user associated with an organization, such as an employee of a company, are provided a payment instrument or card affiliated with that company to make one or more purchases. In order to prevent or limit fraud, as well as detect fraudulent actors, the organization utilizes multiple card identifiers and/or payment cards, where a portion of those identifiers are valid, and another portion are not valid but marked for generation of one or more alerts on use of that portion of identifiers. A monitoring and alert system resides on top of an electronic transaction processing network to detect use of the marked identifiers. If detected, a real-time alert is then transmitted to the organization with data associated with the use of the marked identifiers.

20 Claims, 6 Drawing Sheets

← 300a

Canary Transaction Alert — 302

Hello Cash. We detected a transaction on one of Cash Startup Inc's canary cards. All available transaction information is provided below. If your canary card was stored with other cards, we recommend you review your transactions on the dashboard immediately. — 304

Transaction Time: — 306
   2021/5/24 8:25PM UTC

Merchant Name: — 308
   Taxi

Transaction Amount: — 310
   $42.42

Transaction Type: — 312
   In Person, Card Used - Chip

Receipt Information: — 314
   None

Last Four Card Digits: — 316
   ****1234

Merchant Category: — 318
   Other business expenses

Merchant Location: — 320
   San Francisco, CA

Merchant Website: — 322
   None

Other Information: — 324
   Additional Captured Data

The above information is all information available on the transaction. We recommend you follow up in your logs or with the vendor this card was stored with. For concerns, please contact the Support Team. — 326

Canary Transaction Alert ← 328

---

Hello Cash. We detected a transaction on one of Cash Startup Inc's canary cards. All available transaction information is provided below. If your canary card was stored with other cards, we recommend you review your transactions on the dashboard immediately. ← 330

| | |
|---|---|
| Transaction Time: ← 306<br>  2021/5/21 5:02PM UTC | Last Four Card Digits: ← 316<br>  ****1234 |
| Merchant Name:   308<br>  Taxi | Merchant Category: ← 318<br>  Other business expenses |
| Transaction Amount: ← 310<br>  $18.26 | Merchant Location: ← 320<br>  San Francisco, CA |
| Transaction Type: ← 312<br>  In Person, Card Used - Chip | Merchant Website: ← 322<br>  None |
| Receipt Information: ← 314<br>  None | Other Information: ← 324<br>  Additional Captured Data |

The above information is all information available on the transaction. We recommend you follow up in your logs or with the vendor this card was stored with. For concerns, please contact the Support Team. ← 326

CANARY CARD IDENTIFIERS FOR REAL-TIME USAGE ALERTS

TECHNICAL FIELD

The present application generally relates to marked card identifiers and alert control systems and more specifically to canary card identifiers that cause real-time generation of one or more alerts in response to a use of the canary card identifiers.

BACKGROUND

Organizations, such as businesses and companies, may utilize electronic transaction processing software, hardware, and other infrastructure to process transactions using identifiers for financial or payment instruments. This includes processes for establishing and issuing payment instruments, processing transactions, and generating transaction history data. These payment instruments may include payment cards, which may be real and/or virtual. Each payment card may be associated with a balance or available limit and may be identified using a card identifier. However, present networked systems and available infrastructure merely provide for a few specific administrators who are manually required to review and approve payments, as well as collect information and protect from fraud. Organizations may be increasingly at risk from computing attacks that compromise data and open the organizations to fraud. This may be taxing for small organizations that may have limited employees and offices, and for large organizations or companies, where expenses may come from a wide range of employees, this data is difficult to track and properly protect from fraud. Further, any review to protect from data misappropriation and fraud occurs from later review. Thus, these present systems fail to properly provide real-time alerts to limit and/or prevent digital fraud when computing systems are breached.

Therefore, there is a need to address deficiencies with conventional electronic transaction processing systems that utilize card identifiers that are prone to misuse and fraud.

BRIEF DESCRIPTION OF THE DRAWINGS

FIG. 3A is an exemplary user interface displaying a first alert generated from use of a canary card identifier during electronic transaction processing, according to an embodiment;

FIG. 3B is an exemplary user interface displaying a second alert generated from use of a canary card identifier during electronic transaction processing, according to an embodiment;

Figure 1:
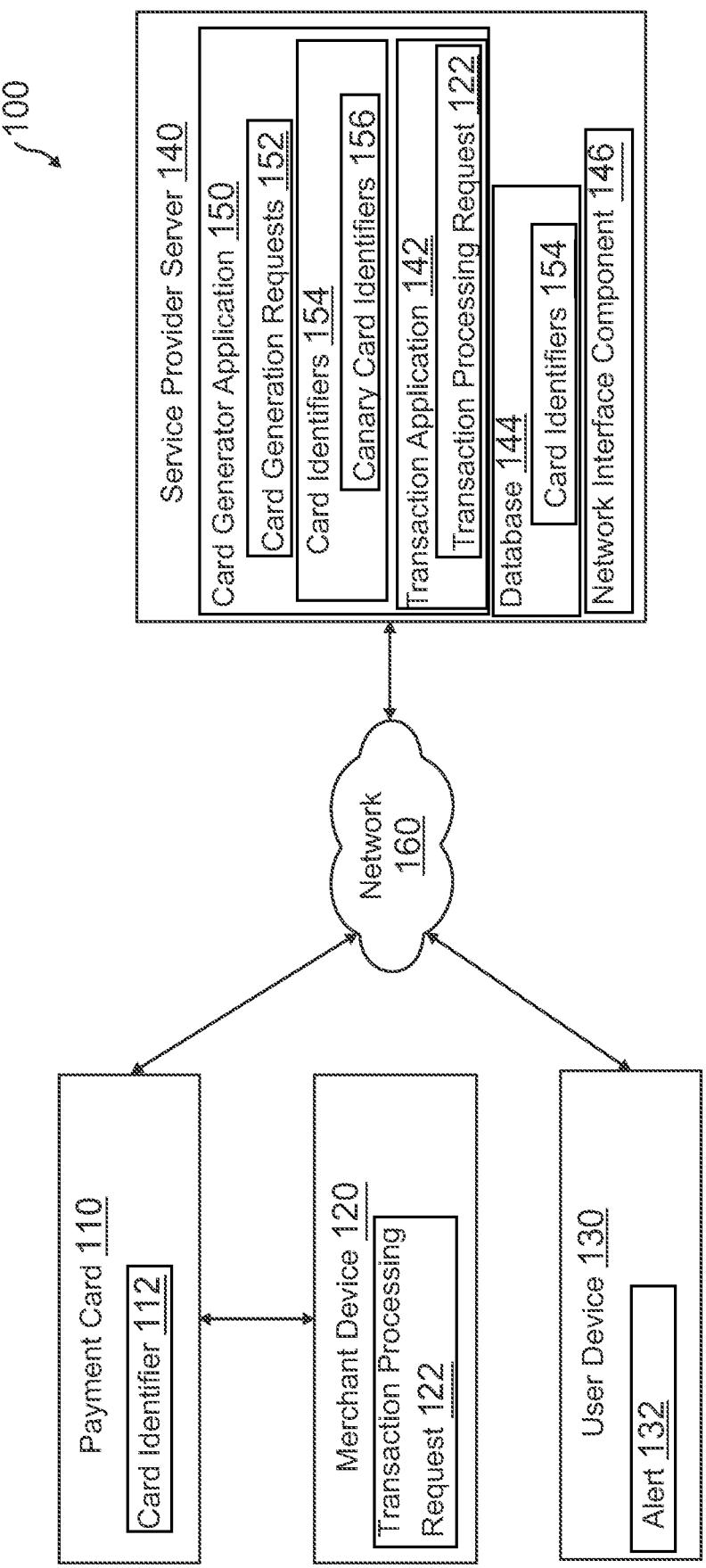
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for providing and using canary card identifiers for real-time usage alerts. Systems suitable for practicing methods of the present disclosure are also provided.

An organization may issue one or more payment cards to customers, clients, and/or employees to process payments through an electronic card and/or transaction network associated with a backend payment processor on the network. A payment card may be linked to an account with an online transaction service provider, such as a service provider that facilitates processing of payments and enforcement of expense policies for payment instruments. In one example, such a payment and card processing system may be provided by BREX®, Inc. of San Francisco, CA, USA., which may provide electronic transaction processing services to customers and client organizations through credit accounts, debit cards, direct debit/credit through automated clearing house (ACH), wire transfers, gift cards, and other types of funding sources. The funding sources may be issued to organizations by the payment and card processing system, and well as other financial service providers integrated with the payment and card processing system. Digital accounts and physical payment cards may be used for in-store or physical payment transactions, such as by scanning a payment card or capturing data representing the account via a point-of-sale (POS) device and the like. Further, accounts and cards (including card identifiers) may also be used via one or more websites and/or applications of online merchants.

A networked system for payment and card processing and management may include a framework and architecture to provide payment gateways, billing platforms, eCommerce platforms, invoicing, and additional services. Organizations may be required to select payment networks utilized for issuance of payment instruments and transaction processing, which may include payment cards (e.g., credit or debit cards) or other types of funding sources. The payment networks may correspond to resolution networks for payment processing of expenses purchased using an account identifier, payment card, or the like during electronic and in-person transaction processing. However, organizations may have different account and/or card identifiers issued to the organization, and which may be provided during transaction processing. Where these identifiers are misappropriated, stolen, and/or fraudulently used, the organization may not be immediately aware of the fraud. Further, organizations may be required to review accounting and transaction histories to detect the fraud, which may allow some fraud to be unrecognized and resolved.

In this regard, one or more payment instruments may be issued to users or employees of an organization, including sales, management, information technologies, or other employees. The payment instruments may correspond to various types of payment cards and/or account identifiers, which may be issued by the card processing and/or issuing system, or by an associated partner (e.g., an issuing bank that provides credit cards or another financial instrument). During the course of business, an employee may engage in commerce with one or more merchants using a payment instrument, such as by making an in-person (e.g., at a merchant location or store) or online purchase from the merchant. The user may request electronic transaction processing through the account number or payment instrument identifier(s) provided to the user. Merchants (e.g., a seller or payment receiver, such as a business, fundraiser, healthcare provider, landlord, etc.) may correspond to any person or entity selling goods and/or services (referred to herein as an "item" or "items") to the company's employees. Due to integration with payment networks, the card processing system's framework may receive real-time data of the transaction, for example, prior to the transaction being approved and resolving through such entities.

The card processing system may issue one or more "canary" card identifiers and/or physical payment cards. These canary card identifiers correspond to an alphanumeric code or identifier that uniquely identifies data for each canary card and may imitate valid card identifiers and appear as though the canary card identifiers are legitimate and can be used for processing transactions and providing payments or transfers. In other embodiments, the canary identifiers may instead or also be associated with digital account identifiers for payment accounts that may be used to facilitate payments. The canary card identifiers may be fake or falsified so that the card identifiers cannot be used for transaction processing and payments, are not associated with a digital account, do not have an available account or credit balance, or otherwise would fail transaction processing with a transaction and not provide a payment. Instead, the canary card identifiers may be marked for generating and transmitting an alert to the organization, one or more members of the organization, and/or the card processing system, which would identify a use of the canary card identifiers in a transaction. Thus, the canary card identifiers would instead cause a real-time or near real-time alert to be generated, which indicates that the canary card identifiers have been used. This may be done to indicate that at least the canary card identifiers have been misappropriated or fraudulently used, which may further indicate other valid card identifiers may also have been misappropriated and/or fraudulently used.

With the canary card identifiers, the card processing system that issues the valid and canary card identifiers to one or more organizations may implement and provide a network and card identifier listener system to list for and detect uses of the canary card identifiers. The network and system may be integrated with one or more payment networks for card processor systems and gateways for payment card processing, such as by processing data from physical payment cards (e.g., data and/or identifiers stored by a magnetic strip, EMV chip, smart card chip, or other card chip and storage mechanism, and the like). For example, a Mastercard®, Visa®, Discover®, American Express®, or the like may have a payment card network, card processors, and gateways that may be used to process a transaction when a payment card is used in the transaction (e.g., through a point-of-sale (POS) device, website, online merchant marketplace, or the like). The integration between these networks may allow for application programming interface (API) calls to be exchanged between the card processing system and one or more external card processors and/or gateways. The API calls may allow for APIs to interface and be integrated to exchange these calls when generating and issuing payment and canary card identifiers, as well as detect and exchange API calls during use of canary cards in transactions. The card processing system that issues the canary card identifiers may then provide an infrastructure and integration with these networks to provide another network to detect usages of card identifiers and determine that a canary card identifier has been used through one or more database lookups and/or queries from databases and data tables identifying the canary card identifiers and any operations to execute when the canary card identifiers are used.

Thus, the card processing system providing the canary card identifiers may use the additional network and system integrated with the payment network for card processing to detect a processing and use of a canary card identifier in a transaction. Initially, the canary card identifiers are provided to the organization, which may be provided with the valid card identifiers or provided at another time and/or updated when used. When providing the valid card identifiers and canary card identifiers to the organization, the card processing system may provide the canary card identifiers hidden within the valid card identifiers and/or with data that makes the canary card identifiers appear valid. For example, the canary card identifiers may be listed in a data table of all valid card identifiers. The canary card identifiers may also be issued to users, employees, and/or divisions within the organization or with particular data that causes the canary card identifiers to appear valid. The canary card identifiers may also be provided or listed with data that entices use of the canary card identifiers, such as "All sales division credit card," "No limit credit card," or other text, image, or information that may cause a malicious user or party to believe the canary card identifier is valid, would allow large payments, and/or may be unlikely to be caught in fraudulent transactions.

However, the organization may be informed of which card identifiers are canary card identifiers in order to not accidentally use and/or distribute the canary card identifiers to valid or not fraudulent users (e.g., employees). Thus, when a use of a canary card identifier is detected, the card processing system may want to notify the organization in order to secure transactions from additional fraud. To process a payment, a canary card identifier may be used and/or found in transaction data for a payment request on the payment network, for example, when the acquirer (e.g., the acquiring bank for the merchant that processes the payment instrument provided by the user) requests processing with the issuer (e.g., the issuing bank of the organization and expense management system that issues the payment instrument). This occurs when a user causes a transaction to be generated, and the merchant generates a total for the transaction request, which the user can pay for by providing a payment instrument to the merchant. After receiving the canary card identifier as the payment instrument, the merchant may cause a payment request to be generated for payment of the transaction. In various embodiments, the user may be required to enter additional checkout information, such as a name, delivery location, or other personal or financial information that may be included in the transaction data for the transaction. The card processing system may receive or detect the transaction data for the electronic transaction using the integration with the payment network and determine that the transaction data includes the canary card identifier.

In this regard, when transaction data having the canary card identifier for a transaction is detected and received, the card processing system may identify the canary card identifier as being used from a database lookup or query. The system may further determine what operations are to be executed when the canary card identifier is used. This may correspond to one or more alerts, types of alerts, and/or data for entry and transmission in the alerts to be generated and transmitted based on the use of the canary card identifier. Further, the data may identify which users, entities, digital addresses, phone numbers, or other endpoints are to be contacted and/or receive the alert. In various embodiments, other types of card data, transaction data, messages/communications, or other contextual data may be used for the alert. Additional contextual data may be any data associated with a transaction that may be detected and/or determined by the card processing system. For example, types of card data may include Level 2 (L2 or Level II) and/or Level 3 (L3 or Level III) card or transaction data that accompanies a credit or debit card transaction when the transaction is processed. L2 and/or L3 card data may include a purchase order number, a shipping address or zip code, a billing address or zip code, a destination location, a tax indicator and/or an amount, a consumer and/or merchant name, an item identifier (including an SKU, barcode, QR code, or the like), an item description or name, a price, a number or volume of the item, discounts or applied benefits, a merchant name and/or code, merchant information including an address or location, and similar data that may be used to further define the transaction and provide more detailed transaction information. For example, billing codes may be used to determine transaction information and assign that transaction to a category. Similarly, this card data may be used to determine where an employee or malicious party is conducting a transaction, making a purchase, travelling, or otherwise performing a transaction on behalf of the company and/or using the canary card identifier. For example, a plane ticket purchase may include a destination city as part of the card data.

L2 or L3 card data may be provided and processed during a transaction to provide more detailed information for the transaction, lower card processing fees, and/or enable better authentication and security for fraud analysis and protection. The L2 or L3 data may therefore provide more granular transaction data that may inform a user viewing the alert of the fraudulent activity. The alert may then be generated in real-time or near real-time during the transaction, and transmitted to the appropriate users, parties, contact addresses, and the like in real-time or near real-time so that alerts may be viewed during the fraudulent transaction processing. The receiving addresses may correspond to email, instant messaging, voice communication (e.g., telecommunication or VoIP), text messaging, social networking, microblogging, and other applications and communication services. The card processing system may then determine if further users or entities should be alerted, such as an authority, the merchant in the transaction, or the like. The card processing system may further decline processing and/or payment on the payment network based on the use of the canary card identifier, and/or the canary card identifier may not be processed by virtue of having a zero balance or designation that payments should not be processed using the canary card identifier. Thus, the transaction processing request for the transaction using the canary card identifier may be declined and/or prevented from processing After a use of a canary card identifier and generation of an alert, the canary card identifier that was used may be burned, flagged, or otherwise identified as used and therefore likely to be recognized as invalid and/or a canary card. The card processing system may further generate one or more new canary card identifiers, which may be used to replace the burned canary card identifiers. However, in other embodiments, the canary card identifier may be left as open or usable in order to detect additional fraud by other malicious parties that may have compromised data from the organization. In some embodiments, the canary card identifier and/or alert may also include a functionality to approve the underlying transaction and/or supply a new payment source and/or valid card identifier. This may occur when an employee of the organization accidentally used the canary card identifier, but the underlying transaction was valid and/or approved. In further embodiments, the alert and/or use of the canary card identifier may further cause one or more account freezes or prevention of account and/or fund uses to be issued and/or execute. This may prevent further fraud where other valid card identifiers have also been compromised. Thus, the account freezing may be executed automatically or may be selected and initiated through the alert transmitted to one or more entities of the organization.

As such, systems and methods are provided to enable a company to better manage electronic transaction data and prevent fraud. This may be done by issuing specifically marked identifiers and implement a new and improved network and processing system to integrate with payment networks. Thus, alerts may be generated in real-time when use of a marked identifier is detected, and organizations may be provided with faster and coordinated messaging and communications to limit electronic fraud, data misappropriation, and other computing attacks that compromise sensitive data of the organizations. Further, additional data may be determined and recorded in order to document the fraudulent activities on payment networks.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a payment card 110, a merchant device 120, a user device 130, and a service provider server 140 in communication over a network 160. A user (not shown) may correspond to an employee, contractor, shareholder, or other suitable person (not shown and generally referred to herein as an "employee") of a company associated with user device 130, which may utilize payment card 110 to submit purchase requests for items to be paid using company funds. Payment card 110 may correspond to a payment instrument allowing for purchase of items using company funds, which may be provided and managed by service provider server 140. However, payment card 110 may also correspond to a canary card and/or canary card identifier that does not have a balance and/or enable transaction processing but instead causes alerts to be generated when used. Service provider server 140 may process payments using payment card 110 and/or cause alerts to be generated based on use of payment card 110. Further, service provider server 140 may interact with merchant device 120 for transaction processing and/or alert generation based on use of payment card 110.

Merchant device 120, user device 130, and service provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Payment card 110 may correspond to a physical and/or virtual payment card having a card identifier 112 that is supplied and/or read during transaction processing to effectuate a payment to another user, merchant, entity, or the like. In this regard, payment card 110 may be read by merchant device 120 and/or card identifier 112 may be provided to merchant device 120 for electronic transaction processing for a transaction. Payment card 110 may be issued to an employee using user device 130 and/or another employee, entity, division, team, or the like for an organization. Payment card 110 may be linked to a funding source, credit or bank account balance, or the like and may therefore be used to provide payments. In some embodiments, payment card 110 corresponds to a canary card, and/or card identifier 112 corresponds to a canary card identifier that instead causes one or more alerts to be generated on use. In such embodiments, payment card 110 may not be linked to a balance, have a zero balance and thus no underwriting, and/or may not be used for valid transaction processing.

Merchant device 120 may be maintained, for example, by a merchant or other entity selling one or more items to users, which may include single users or groups of independent users as well as small and large merchants. Merchant device 120 may provide the items for sale, such as through use of various software, infrastructure, websites, applications, and/or other platforms for advertisement, sale, and payment processing. In this regard, merchant device 120 may include a device having processing applications, which may be configured to interact with user device 130 and/or service provider server 140 to engage in transactions, for example, by processing a transaction processing request 122 using payment card 110. In some embodiments, merchant device 120 may be implemented as a single or networked personal computers (PCs), a smart phone, laptop computer, wearable computing device, and/or other types of computing devices. Although only one merchant device is shown, a plurality of merchant devices may function similarly.

Merchant device 120 may be implemented with an application offering items for sale that may be accessed by a computing device to present the items for sale to the user associated with card identifier. In certain embodiments, the application may provide a website available over the Internet and/or online content and/or database information accessible through a dedicated application. The application may provide item sales through an online marketplace using the website of the merchant. The application may also correspond to a checkout application at a physical merchant location, such as the application(s) of a point-of-sale (POS) device used to provide sales at physical locations. Merchant device 120 may be used to establish a transaction once a user/employee associated with user device 130 has selected one or more items for purchase. Once a payment amount is determined for the item(s) to be purchased by the user, merchant device 120 may request payment using payment card 110 for transaction processing request 122. After input, merchant device 120 may then process a payment to the merchant associated with merchant device 120 using payment card 110. Service provider server 140 may utilize network integration with a payment resolution network to manage payment card 110, approve transaction processing request 122, and/or generate alerts when payment card 110 corresponds to a canary card that is used to identify fraudulent or abusive use of payment card 110 and/or card identifier 112. Service provider server 140 may approve or deny the payment request based on if payment card 110 corresponds to a canary card. Transaction processing request 122 may then be processed, payment provided to the merchant account, and notification of payment (or failure, for example, where a canary card and/or canary card identifier is used) may be sent to merchant device 120. Merchant device 120 may then receive the results of transaction processing request 122 and may further track and/or provide additional data, such as L2 or L3 card data for transaction processing.

User device 130 may be utilized by an employee of an organization or company that employs one or more users, for example, to receive one or more alerts from service provider server 140 in response to uses or canary cards, such as payment card 110 where designated as a canary card. For example, in one embodiment, user device 130 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In this regard, user device 130 includes one or more processing applications which may be configured to interact with service provider server 140 to manage payment card 110 and/or alerts provided by service provider server 140 and further provide data utilized by service provider server 140. Although only one communication device is shown, a plurality of communication devices may function similarly.

User device 130 may be implemented with an application that may manage payment cards including canary cards and canary card identifiers, and further receive alerts in response to uses of canary card identifiers in transactions. In certain embodiments, the application may be configured to interface and/or communicate with service provider server 140 over network 160. The application may receive an alert 132 from service provider server 140 via a text message, email, instant message, dashboard interface message for a digital account, or other communication channel. Alert 132 may be associated with a use of payment card 110 where payment card 110 corresponds to a canary card, and therefore alert 132 may include data regarding the use of payment card 110. Alert 132 may be received in real-time or near real-time when use of payment card 110 occurs, such as when merchant device 120 attempts to process card identifier 112 in a transaction. Further, alert 132 may include information regarding the transaction and/or use of the canary card identifier for card identifier 112 by merchant device 120. For example, the alert may include transaction information, information provided by the user requesting the transaction, and/or L2 or L3 card data. Alert 132 may further include one or more executable processes, such as those to approve the transaction and supply a valid payment instrument, contact an authority and/or the merchant for merchant device 120, request burning or disposal of card identifier 112, implementing a freeze on an account, or the like.

In various embodiments, the application may include a general browser application configured to retrieve, present, and communicate information over the Internet (e.g., utilize resources on the World Wide Web) or a private network. For example, the application may provide a web browser, which may send and receive information over network 160, including retrieving website information, presenting the website information to the user, and/or communicating information to the website, including payment information. However, in other embodiments, the application may include a dedicated application of service provider server 140 or other entity, which may be configured to assist in establishing and maintaining payment and canary card identifiers, receive alerts, and/or interact with devices on one or more payment networks.

Service provider server 140 may be maintained, for example, by an online service provider, which may provide payment instruments and payment processing services to companies and other organizations. In this regard, service provider server 140 includes one or more processing applications which may be configured to interact with merchant device 120 and user device 130 to facilitate processing of payments and use of canary card identifiers, such as ones associated with payment card 110. In one example, service provider server 140 may be provided by BREX®, Inc. of San Francisco, CA, USA. However, in other embodiments, service provider server 140 may be maintained by or include other types of credit providers, financial services providers, and/or other service provider, which may provide expense management services to companies.

Service provider server 140 of FIG. 1 includes a card generator application 150, transaction application 142, a database 144, and a network interface component 146. Card generator application 150 and transaction application 142 may correspond to executable processes, procedures, and/or applications with associated hardware. In other embodiments, service provider server 140 may include additional or different modules having specialized hardware and/or software as required.

Card generator application 150 may correspond to specialized hardware and/or software to allow companies to receive payment instruments associated with a bank account and funding of the company, such as one or more company credit cards, and provide expense management for those issued payment instruments and additional funds/accounts of the company. In this regard, a company may first establish an account with expense management system by providing company data and onboard through card generator application 150. Such information may include bank account and funding information, such as verified funding from investors, available funds directly in an account, and burn rate of company funds over a time period. If qualified, service provider server 140 and/or another issuing entity may provide a payment instrument that is managed by card generator application 150. For example, service provider server 140 may issue payment card 110 for a real or virtual credit card or may issue other types of payment instruments and instrument identifiers that may be used for company payments.

Card generator application 150 may provide one or more processes accessible by an administrator or other employee of an organization to establish and issue payment instruments for use, including payment card 110, where one or more of the payment instruments may correspond to canary identifiers that have a zero balance or are not valid for transaction processing but cause generation of alerts. In this regard, the administrator may establish and/or select types of payment instruments and corresponding payment instrument information, which correspond to attributes for a maximum purchase amount, maximum spend over a time period, merchant/item types, location, hours of purchase, etc. Card generator application 150 may further provide additional processes for use with requesting and/or establishing one or more canary card identifiers. The additional functionality and processes provided by card generator application 150 are described in more detail with regard to the additional Figures of the application, such as FIGS. 2, 3A, 3B, and 4.

Card generator application 150 may receive card generation requests 152, which may request that payment cards, both physical and/or virtual cards, and their corresponding card identifiers 154 be generated. Card generation requests 152 may designate a number of payment cards and a corresponding credit or bank account balance for use with the valid payment cards and identifiers. Additionally, card generation requests 152 may designate a number of canary cards to be generated so that card identifiers 154 include valid card identifiers for use in transactions to effectuate payments and canary card identifiers 156 for generating alerts on use of canary card identifiers 156. With canary card identifiers 156, the administrator or other employee may designate devices, communication addresses or identifiers, communication channels, and/or users to receive the alerts when canary card identifiers 156 are used. The alerts may be transmitted to those users and/or devices in real-time and/or near real-time on use of canary card identifiers 156. Further, card generation requests 152 may designate the additional transaction or contextual data to include with an alert, such as L2 or L3 card data detected during a transaction based on input by the merchant or other transaction data. The additional contextual data may include communications between parties and/or data entered by users for a transaction using one or more of canary card identifiers 156, such as merchants and/or transaction requesters. For example, a location, client name, user identifier, or other information may be provided in an alert and used to determine fraud.

Transaction application 142 may provide one or more processes to process transactions, including transactions using card identifiers 154 and/or provide one or more alerts in response to detection of one or more of canary card identifiers 156 in the transactions. In this regard, transaction application 142 may include or provide one or more computing operations, services, and/or networks that may reside as one or more layers under a transaction processing flow for transactions processed over network 160, such as between merchant device 120 and user device 130. Transaction application 142 may utilize this integration with one or more payment networks to detect transaction processing request 122 from merchant device 120, determine card identifier 112 used for transaction processing request 122, and perform one or more database look ups or queries to determine if card identifier 112 corresponds to a canary card identifier. If not, transaction processing request 122 may be processed. However, if card identifier 112 corresponds to a canary card identifier, transaction processing request 122 may be declined or prevented from processing and transaction application 142 or another application may be used to issue alert 132 to user device 130.

In various embodiments, transaction application 142 may be desired in particular embodiments to provide features to service provider server 140. For example, transaction application 142 may include security applications for implementing server-side security features, programmatic client applications for interfacing with appropriate application programming interfaces (APIs) over network 160, or other types of application processes used to effectuate transactions, provide transaction processing security, and/or transmit one or more alerts based on detected uses of canary card identifiers 156. Transaction application 142 may contain software programs, executable by a processor, including a graphical user interface (GUI), configured to provide an interface to the user when accessing service provider server 140 and/or managing transaction processing and accounts.

Additionally, service provider server 140 includes database 144. As previously discussed, the user, entity, and/or organization corresponding to user device 130 may establish one or more accounts with service provider server 140, which may be used to issue payment card 110. Payment accounts in database 144 may include entity information, such as name, address, payment/funding information, additional user financial information, and/or other desired user data. Database 144 may also be used to store transaction data and information on issued payment instruments to the company and transactions processed using those instruments, including card identifiers 154.

In various embodiments, service provider server 140 includes at least one network interface component 146 adapted to communicate with merchant device 120 and/or user device 130 over network 160. In various embodiments, network interface component 146 may comprise a DSL (e.g., Digital Subscriber Line) modem, a PSTN (Public Switched Telephone Network) modem, an Ethernet device, a broadband device, a satellite device and/or various other types of wired and/or wireless network communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Network 160 may correspond to a network utilized for resolution of payment requests and electronic transaction processing, which may be governed by permissions (e.g., acceptances and denials) of payment requests for transaction processing by service provider server 140. In this regard, network 160 may correspond to a credit card or debit card network where an acquiring bank or entity may interact with an issuing bank or entity for the resolution of a payment using payment card 110 and/or detection of use of a canary card identifier corresponding to payment card 110 for generating and transmitting one or more alerts. However, in other embodiments, payment resolution network may correspond to other types of payment networks and payment types, such as direct debit payments (ACH payments), wire exchanges or payments, prepaid card payments, or regionally/company-specific payments.

Network 160 may be implemented or used by service provider server 140 on request by user device 130, and may allow users to interact with the network to submit payments and process transactions, allow third parties (e.g., banks or other financial service intermediaries) to interact on the network on behalf of the user, and/or access or use data provided to or from the payment network, such as notifications of transactions and details that allow authorizing or declining transactions. Service provider server 140 may utilize network 160 in the managing, approval, denial, and data gathering associated with payment requests using company issued payment instruments associated with network 160, such as payment card 110.

Figure 2:
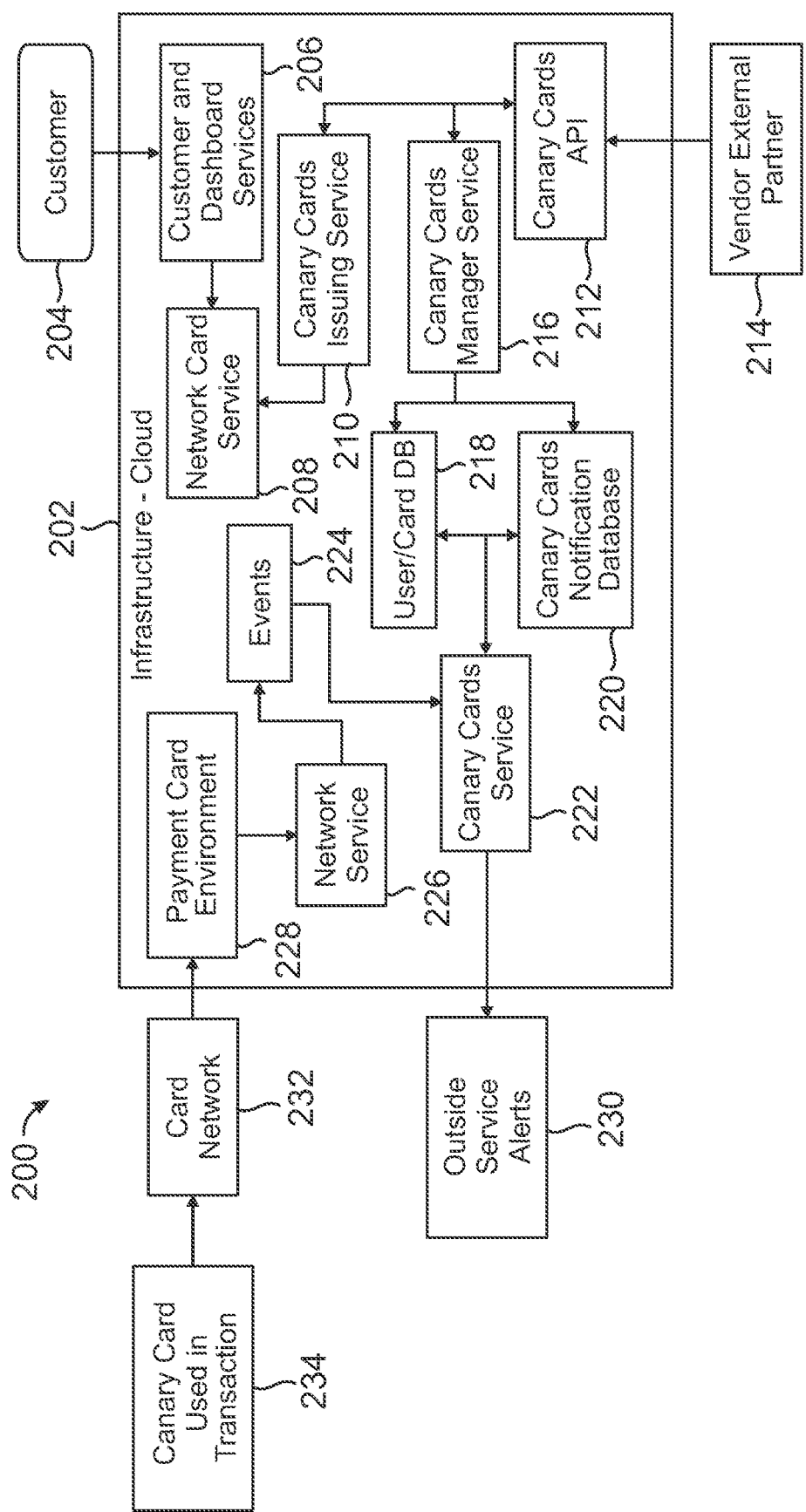
FIG. 2 is an exemplary system environment for matching receipt data to expense data in a transactional database, according to an embodiment.

FIG. 2 is an exemplary system environment 200 for matching receipt data to expense data in a transactional database, according to an embodiment. System environment 200 of FIG. 2 includes a cloud infrastructure 202 that may be provided by a service provider in a cloud computing environment, such as by service provider server 140 discussed in reference to system 100 of FIG. 1. In this regard, an integration between cloud infrastructure 202 may be used to exchange data with and over a card network 232 so that usages of canary card identifiers during transaction processing may be detected and used to generate alerts to a customer 204, such as through outside service alerts 230. Cloud infrastructure 202 may be provided by a cloud computing service provider to the service provider using the canary card services discussed herein, such as by Amazon Web Services (AWS)® and the like.

In system environment 200, customer 204 may interact with cloud infrastructure 202 when utilizing the corresponding computing services for financial accounts, payment cards, and electronic transaction processing, including those for generating valid and canary payment cards and identifiers. Customer 204 may correspond to an organization and/or employees or other users associated with the organization that utilizes the services provided by the service provider. In this regard, customer 204 may access and utilize the services provided by cloud infrastructure 202 through customer and dashboard services 206. Customer and dashboard services 206 may provide one or more user interfaces, such as a dashboard interface, that may be used to request generation of payment cards and/or canary cards, as well as their corresponding identifiers, set alerts and data for alerts (e.g., receiving parties, data contained in alerts including L2 and L3 card data, and the like), and view alerts and other data generated from uses of canary card identifiers during electronic transaction processing. Customer and dashboard services 206 may further be used to otherwise interact with one or more digital accounts, financial services, and the like provided by the corresponding service provider.

Customer and dashboard services 206 may interact with a network card service 208 that manages payment card services between customer 204 and other customers or organizations and a vendor external partner 214 that may issue payment card identifiers. Network card service 208 interacts with a canary cards issuing service 210 that utilizes a canary cards API 212 to exchange API calls and requests, and any required data, with vendor external partner 214. Canary cards API 212 may be used to request generation of payment and canary cards, and their corresponding identifiers, from vendor external partner 214. Canary cards API 212 may transmit an API request generation of the card identifiers, as well as any physical or virtual cards, that include valid card identifiers that may be processed on card network 232. Vendor external partner 214 may receive the request and execute operations to generate one or more alphanumeric card identifiers according to an identifier generation scheme. The card identifiers may further include canary card identifiers or other card identifiers that have a zero balance and/or may not initiate or complete a payment on card network 232 when used. In some embodiments, vendor external partner 214 may further flag or indicate that the canary card identifiers are to be used to generate and transmit an alert to customer 204. However, this may be performed by or in conjunction with a canary cards manager service 216 of the service provider for cloud infrastructure 202.

Canary cards manager service 216 may manage canary cards and canary card identifiers by establishing the canary card identifiers for alerts and designating the additional alert data for each canary card and/or set of canary cards. For example, the additional alert data may include the designation of the receiving parties, contact addresses or identifiers, and/or alert data (e.g., transaction time and/or location, transaction amount and items/services, additional card or transaction data, and the like as discussed in reference to FIGS. 3A and 3B). Canary cards manager service 216 may store canary card and/or valid card data, as well as canary card alerts and notifications, in a user/card database 218 and a canary cards notification database 220. The canary card identifiers and other data, as well as valid card identifiers and data when generated, may then be provided to customer 204, such as through one or more user interfaces provided by customer and dashboard services 206. When providing the canary cards and identifiers, they may be noted to customer 204 as canary cards but may also not be marked as invalid or canary cards to other users and/or external (e.g., malicious parties). For example, in one or more data tables, documents, or spreadsheets that document the card identifiers to internal users and may be compromised by internal and/or external malicious users, the canary card identifiers may appear valid and/or associated with valid users or departments. Further, additional descriptions or data may entice use by malicious parties, such as by noting a high available credit balance, being associated with large departments or high-ranking employees, and the like.

Thereafter, during a canary card use 234, a canary card and/or canary card identifier is attempted to be used during a transaction. Card network 232 may be used to process the canary card during canary card use 234. Card network 232 may be integrated with and/or interact with one or more computing services for cloud infrastructure 202 to detect canary card use 234. In this regard, card network 232 may exchange API calls with and/or send an API request to cloud infrastructure 202. This may be done using a payment card environment 228 that resides underneath a transaction flow for processing payment card identifiers on card network 232, where the payment card identifiers may be processed in conjunction with services provided by cloud infrastructure 202.

Payment card environment 228 may interact with a network service 226 to stream events 224 to a canary cards service 222. Network service 226 may be used to stream events 224 when detected by payment card environment 228 from card network 232. Events 224 may correspond to Apache Kafka® event streaming services that streams data events from network service 226 as detected, where canary cards service 222 may then process the events. In this regard, events 224 may include one or more events from canary card use 234 on card network 232. Thereafter, canary cards service 222 may interact with user/card database 218 and canary card notification database 220 to perform one or more database look ups and/or queries for data in data tables associated with canary card identifiers and corresponding alerts. Based on canary card use 234, a matching canary card identifier may be determined by canary cards service 222, and data for one or more alerts for transmission based on canary card use 234 may be determined. Thereafter, canary cards service 222 may generate an alert for customer 204, which may be generated in real-time or near real-time with canary card use 234. The alert may be output through platforms for outside service alerts 230, such as one or more communication channels and/or services that may be used to communicate with customer 204. For example, outside service alerts 230 may correspond to email, text message, messages via customer and dashboard services 206, and the like. In some embodiments, outside service alerts 230 may be provided to employees of customer organizations through Slack™ or the like, such as using a Slack™ webhook.

FIG. 3A is an exemplary user interface 300*a* displaying a first alert generated from use of a canary card identifier during electronic transaction processing, according to an embodiment. A canary transaction alert 302 may be provided to a customer organization of a service provider, such as by service provider server 140 discussed in reference to system 100 of FIG. 1. In this regard, canary transaction alert 302 may be displayed by a computing device of an employee of the customer organization, such as on user device 130 discussed in reference to system 100.

User interface 300*a* displays canary transaction alert 302 as an exemplary alert that may be generated and output responsive to use of a canary card and/or identifier in a transaction processing request, such as one requesting electronic transaction processing for a transaction between a user and a merchant. The use of the canary card and/or identifier may prevent the electronic transaction processing, for example, by having a zero balance or being ineligible for the electronic transaction processing and therefore returning a declined status. However, use of the canary card and/or identifier may cause an underlying service for a service provider and/or card processing system to generate canary transaction alert 302 when an event indicating the usage of the canary card and/or identifier is detected.

Canary transaction alert 302 may be transmitted to a user, employee, department, and/or contact address or dashboard portal designated for the canary card and/or organization. Canary transaction alert 302 may further be standardized by the corresponding service provider transmitting the canary card usage alerts or may be custom configured by the organization based on requested data for the use of the canary card. In this regard, canary transaction alert 302 includes an alert message 304, a transaction time 306, a merchant name 308, a transaction amount 310, a transaction type 312, receipt information 314, a card identifier 316, a merchant category 318, a merchant location 320, a merchant website 322, other information 324, and support notification 326. This data allows the corresponding organization to review canary transaction alert 302 and determine corresponding actions to take in order to resolve the attempted fraud and/or protect computing systems.

For example, transaction time 306, merchant name 308, and transaction amount 310 may each include information that allows the organization to determine when, where and/or with whom, and for how much the canary card was used. This may allow the organization to determine if the transaction was purposeful fraud or an accidental use by an employee. Similarly, transaction type 312 may show whether the canary card was present and physically provided and used during the transaction (e.g., a card-present and/or in-person transaction using a physical card) or digitally used (e.g., a card-not-present transaction, that may be conducted over a network or communication session). Receipt information 314 may be used to show a receipt, which may have items purchased, tax, signatures, tip, and the like. Card identifier 316 may also be used to designate the specific canary card used, as whether that canary card should be burned or made invalid, retained as valid to catch additional fraud, or whether an employee may have accidentally used.

Additional card and/or transaction information may allow determination of the fraudulent or malicious entity and/or the breach of data by the organization and/or an authority utilized by the organization to protect from fraud and/or reverse or recover from fraud. In this regard, merchant category, merchant location, and merchant website may be used to determine additional information about the merchant where the fraud occurred. This may be used to determine if the merchant is fraudulent or also a victim of a malicious entity that fraudulently uses misappropriated data. Other information 324 may include information determined from the transaction and/or payment network. In some embodiments, other information 324 may include L2 or L3 data captured for the transaction. However, other data for the transaction may also be determined from the merchant and/or payment network processing the transaction.

FIG. 3B is an exemplary user interface 300b displaying a second alert generated from use of a canary card identifier during electronic transaction processing, according to an embodiment. A canary transaction alert 328 may be provided to a customer organization of a service provider, such as by service provider server 140 discussed in reference to system 100 of FIG. 1. In this regard, canary transaction alert 328 may be displayed by a computing device of an employee of the customer organization, such as on user device 130 discussed in reference to system 100.

User interface 300b displays canary transaction alert 328 as another exemplary alert that may be generated and output responsive to another use of a canary card and/or identifier in an additional transaction processing request. In this regard, canary transaction alert 328 may further include an alert message 330, which may be changed or updated for the particular transaction or may include the same or similar information to alert message 304. Canary transaction alert 328 further has fields for transaction time 306, merchant name 308, transaction amount 310, transaction type 312, receipt information 314, card identifier 316, merchant category 318, merchant location 320, merchant website 322, other information 324, and support notification 326. However, as shown in user interface 300b, different data is shown in one or more of the field for canary transaction alert 328. Further, in some embodiments, the fields in canary transaction alert 328 may be changed or updated for the particular organization and/or canary card associated with generating canary transaction alert 328 when use of a corresponding canary card and/or identifier is detected.

Figure 4:
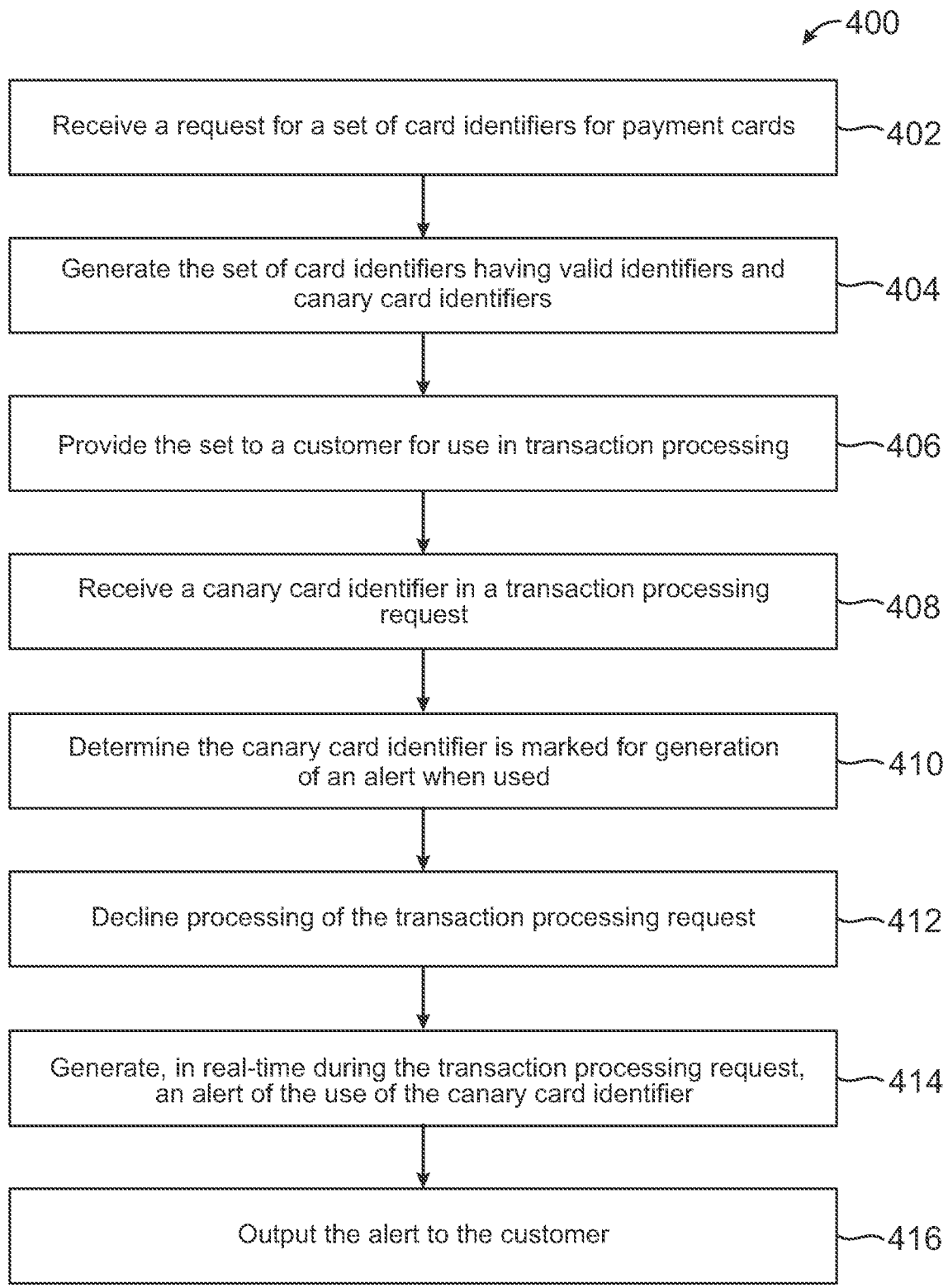
FIG. 4 is an exemplary flowchart for canary card identifiers for real-time usage alerts, according to an embodiment.

FIG. 4 is an exemplary flowchart 400 for canary card identifiers for real-time usage alerts, according to an embodiment. Note that one or more steps, processes, and methods of flowchart 400 described herein may be omitted, performed in a different sequence, or combined as desired or appropriate.

At step 402 of flowchart 400, a request for a set of card identifiers for payment cards is received. The request may designate a number of valid payment cards to be generated, as well as a number of canary payment cards that do not have a balance or credit or otherwise may not be processed but instead cause an alert to be generated. The request may be received by a service provider, such as an online transaction processor and/or card processing system that may provide computing services for the canary payment cards. These services may include detecting use of the canary cards, generating alerts, and/or transmitting the alerts in real-time or near real-time for the use of the canary cards. Further, the service provider may provide additional services, such as expense management, payment card issuance and/or underwriting services, payment card and digital account management, and the like.

At step 404, the set of card identifiers having valid identifiers and canary card identifiers is generated. Valid identifiers may be generated for those payment cards meant for use with a balance, such as those payment cards that may have a debit or credit balance underwritten for the corresponding organization and/or employees of the organization. In this regard, the valid identifiers may be issued digitally and/or provided with physical payment cards. In contrast, the canary card identifiers may be generated without a valid or usable balance or credit, such as a zero balance or credit and/or not linked to the available credit balance underwritten for the organization. Instead, the canary card identifiers may be linked to alert generation data for alerts that are generated and transmitted to the organization in response to a use of the canary card identifiers.

At step 406, the set is provided to a customer for use in transaction processing. The canary card identifiers may be made known to the organization when provided so that the organization will not issue or provide those to trusted employees for valid transaction processing. However, the service provider and/or the organization may create or store the valid identifiers in one or more data structures with the canary card identifiers. In this regard, if the data structure storing the card identifiers comprise compromised or misappropriated by an external malicious party, or if an internal malicious party gains access to the data structure, and fraud is attempted, the canary card identifiers may be used by such parties. This may be done while attempting use of multiple different cards by the malicious parties or the canary cards may be described to entice individual usage, and therefore the canary card identifiers allow for fraud alerts in real-time when comprised data is used.

At step 408, a canary card identifier is received in a transaction processing request. The canary card identifier may be received when detecting use of the canary card identifier when a merchant or other payee device attempts processing of the transaction processing request over a payment network. An integration between the service provider's canary card system with the payment network may allow for listening to data processing events that include the canary card identifier. A database search or look up of the canary card identifier may occur with the transaction processing request, and when the canary card identifier is detected as such, alert generation data may be retrieved. In order to prevent processing of the transaction, at step 412, processing of the transaction processing request is declined. The transaction processing request may be declined on the payment network by the service provider and/or by a card processing gateway, for example, if the canary card identifier is provided a zero balance or credit or is not a valid identifier for processing on the payment network. However, the canary card identifier may appear valid so that use by malicious parties is encouraged.

At step 414, in real-time during the transaction processing request, an alert of the use of the canary card identifier is generated. The alert may be generated to coincide with the transaction processing request and may include data relevant to the underlying transaction where the canary card identifier was used. Thus, the alert may include data recording the use of the canary card identifier and may assist the organization and/or an authority with determining the culprit of the fraud and/or limiting additional fraud. At step 416, the alert is output to the customer. The alert may be provided to the customer's organization, employees, and/or contact addresses/identifiers as designated by the customer for canary card alerts. This may be provided through a business communication channel and platform, such as Slack™ that allows Internet Relay Chat (IRC) features and/or IRC-like features for Internet chats and communications. In this regard, one or more channels, communication chains, and the like may be updated with an alert of the use.

Thus, using various embodiments discussed herein, companies and other organizations can better (e.g., more efficiently and more accurately) track and manage identifiers used for electronic transaction processing by tracking, alerting, and otherwise managing canary card identifiers. This allows for real-time alerts to be generated to minimize fraud caused by breaches of data. Accordingly, the various embodiments discussed herein provide improved data security techniques with faster and more coordinated data transmissions when data breaches occur and are detected.

Figure 5:
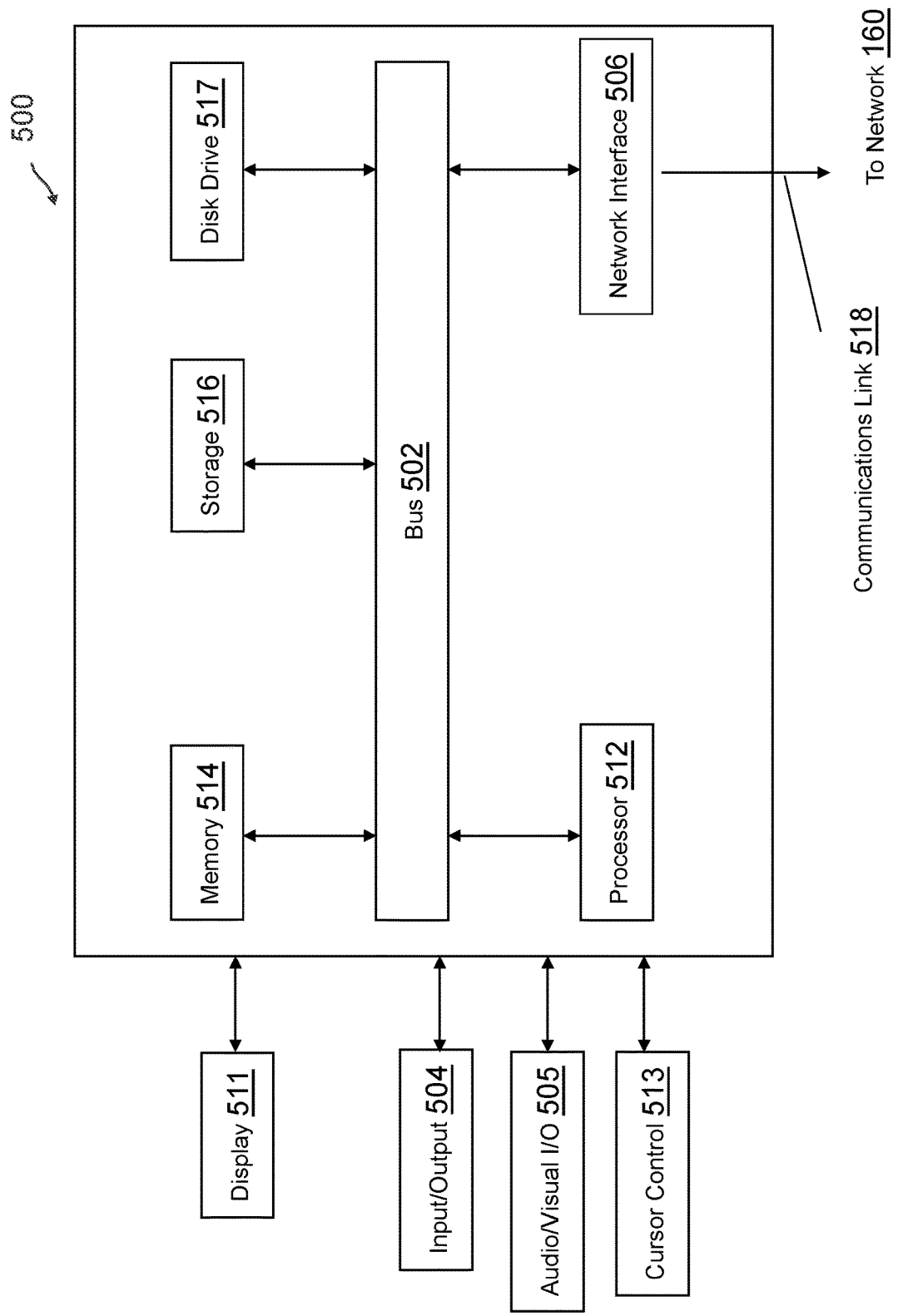
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:
1. A system comprising:
a non-transitory memory storing instructions; and
one or more hardware processors coupled to the non-transitory memory and configured to read the instructions from the non-transitory memory to cause the system to perform operations comprising:
creating, on behalf of an organization, a data structure that includes:
(a) an alphanumeric card identifier that is representative of a canary card to be utilized for a genera- tion of one or more alerts for fraud upon use of the alphanumeric card identifier in a transaction processing request, and (b) one or more valid card identifiers that represent valid cards that are usable in further transaction processing requests;

exchanging a plurality of application programming interface (API) calls on a network between an external card gateway and the organization, wherein the exchanging comprises:

issuing, using a first set of the plurality of API calls, the alphanumeric card identifier and the one or more valid card identifiers to the organization via the network, such that the alphanumeric card identifier is not distinguishable by the organization from the one or more valid card identifiers, and listening, from the external card gateway using a second set of the plurality of API calls exchanged between a layer of the system residing on the network and the external card gateway, for the transaction processing request having the alphanumeric card identifier;

receiving, by the layer from a card processing device based on the listening, the transaction processing request for electronic transaction processing using the alphanumeric card identifier for the organization utilizing an online transaction processer associated with the system;

performing a database lookup for the alphanumeric card identifier from the data structure stored by a card identifier database for the online transaction processor;

determining that the alphanumeric card identifier is marked for the generation of the one or more alerts;

declining, via one or more second API calls exchanged between the external card gateway and the system, the transaction processing request at the card processing device for the electronic transaction processing utilizing the online transaction processor, wherein the declining causes a first notification of the declining to be populated on the card processing device by the card processing gateway;

generating a real-time alert for the online transaction processor based on determining that the alphanumeric card identifier is marked for the generation of the real-time alert, wherein the real-time alert indicates that the alphanumeric card identifier was used in the transaction processing request; and outputting, in real-time with the transaction processing request, the real-time alert to the organization.

2. The system of claim 1, wherein the issuing
generating the alphanumeric card identifier based on a request for the alphanumeric card identifier from the organization, wherein the request identifies data for the one or more alerts and an electronic communication channel; and transmitting the alphanumeric card identifier to the organization with the data structure.

3. The system of claim 2, wherein the alphanumeric card identifier comprises one of a plurality of card identifiers generated for the data structure, wherein the plurality of card identifiers comprise the one or more valid card identifiers for the electronic transaction processing and one or more fake card identifiers for the generation of the one or more alerts that include the alphanumeric card identifier.

4. The system of claim 3, wherein the one or more valid card identifiers are designated for use by at least one of different users or different departments of the organization, wherein the one or more valid card identifiers are further rotatable with the at least one of different users or the different departments, and wherein the one or more fake card identifiers are listed with the one or more valid card identifiers in the data structure corresponding to one or more of a data table, a spreadsheet, or a card usage document for the organization.

5. The system of claim 1, wherein the operations further comprise:

responsive to the outputting of the real-time alert, marking the alphanumeric card identifier as a burned card identifier with the online transaction processor and the organization;

generating a new alphanumeric card identifier for the generation of the one or more alerts; and notifying the organization of the new alphanumeric card identifier.

6. The system of claim 1, wherein the alphanumeric card identifier is not associated with an available balance or credit for the electronic transaction processing, and wherein the alphanumeric card identifier further causes an alert to be populated on the card processing device that the alphanumeric card identifier is marked for the generation of the one or more alerts.

7. The system of claim 1, further comprising:

a computing integration with the network for a card processor corresponding to the external card gateway, wherein the system receives level two and level three card data for the electronic transaction processing via the computing integration for the one or more alerts.

8. The system of claim 1, wherein the real-time alert comprises at least one of an approval process for selecting another transaction processing source for the transaction processing request or an option to notify a merchant or authority associated with the transaction processing request of a potential fraud from the transaction processing request using the alphanumeric card identifier.

9. The system of claim 1, wherein the operations further comprise:

responsive to the outputting of the real-time alert, implementing a freeze on an account associated with the alphanumeric card identifier or another card identifier of the organization.

10. A method comprising:

creating, by an online transaction processor on behalf of an organization, a data structure that includes:

(a) a card identifier that is representative of a canary card to be utilized for generation of one or more alerts for fraud upon use of the card identifier in a transaction processing request, and (b) one or more valid card identifiers that represent valid cards that are usable in further transaction processing requests;

exchanging, by the online transaction processor using a layer of the online transaction processor residing on a network, a plurality of application programming interface (API) calls on a network between an external card gateway and the organization, wherein the exchanging comprises:

issuing, over the network using the layer and a first set of the plurality of API calls, the card identifier and the one or more valid card identifiers to the organization via the network, such that the card identifier is not distinguishable by the organization from the one or more valid card identifiers;

listening, from the external card gateway using a second set of the plurality of API calls exchanged between the layer and the online transaction processor, for the transaction processing request having the card identifier;

receiving, by the layer from a card processing device based on the listening, the transaction processing request for electronic transaction processing using the card identifier for the organization utilizing the online transaction processer;

accessing, from a database accessible by the online transaction processor, the card identifier from the data structure stored by the database;

determining whether the card identifier is marked for the generation of the one or more alerts;

determining, via one or more second API calls exchanged between the external card gateway the online transaction processor based on whether the card identifier is marked for the generation of the one or more alerts, whether to decline the transaction processing request with the card processing device for the electronic transaction processing utilizing the online transaction processor, wherein declining the transaction processing request causes a first notification to be displayed on the card processing device by the card processing gateway;

generating, when the transaction processing request is determined to be declined, a real-time alert for the online transaction processor based on determining that the card identifier is marked for the generation of the real-time alert, wherein the real-time alert indicates that the card identifier was used in the transaction processing request; and outputting, during processing of the transaction processing request and when the transaction processing request is determined to be declined, the real-time alert to the organization.

11. The method of claim 10, wherein the issuing comprises:

generating the card identifier based on a request for the alphanumeric card identifier from the organization, wherein the request identifies data for the one or more alerts and an electronic communication channel; and transmitting the card identifier to the organization with the data structure.

12. The method of claim 11, wherein the card identifier comprises one of a plurality of card identifiers generated for the data structure, wherein the plurality of card identifiers comprise the one or more valid card identifiers for the electronic transaction processing and one or more fake card identifiers for the generation of the one or more alerts that include the card identifier.

13. The method of claim 12, wherein the one or more valid card identifiers are designated for use by at least one of different users or different departments of the organization, wherein the one or more valid card identifiers are further rotatable with the at least one of different users or the different departments, and wherein the one or more fake card identifiers are listed with the one or more valid card identifiers in the data structure corresponding to one or more of a data table, a spreadsheet, or a card usage document for the organization.

14. The method of claim 10, further comprising:

responsive to the outputting of the real-time alert, marking the card identifier as a burned card identifier with the online transaction processor and the organization;

generating a new card identifier for the generation of the one or more alerts; and notifying the organization of the new card identifier.

15. The method of claim 10, wherein the card identifier is not associated with an available balance or credit for the electronic transaction processing, and wherein the card identifier further causes an alert to be populated on the card processing device that the card identifier is marked for the generation of the one or more alerts.

16. The method of claim 10, further comprising:

integrating with the network for a card processor corresponding to the external card gateway-using the layer for a transaction application of the service provider system; and receiving level two and level three card data for the electronic transaction processing via the electronic transaction processing network for the one or more alerts.

17. The method of claim 10, wherein the real-time alert comprises at least one of an approval process for selecting another transaction processing source for the transaction processing request or an option to notify a merchant or authority associated with the transaction processing request of a potential fraud from the transaction processing request using the card identifier.

18. The method of claim 10, further comprising:

responsive to the outputting of the real-time alert, implementing a freeze on an account associated with the card identifier or another card identifier of the organization.

19. A non-transitory machine-readable medium having stored thereon machine-readable instructions executable to cause a machine to perform operations comprising:

creating, by an online transaction processor on behalf of an organization, a data structure that includes:

(a) a card identifier that is representative of a canary card to be utilized for generation of one or more alerts for fraud upon use of the card identifier in a payment request, and (b) one or more valid card identifiers that represent valid cards that are usable in further payment requests;

exchanging, by the online transaction processor using a layer of the online transaction processor residing on a network, a plurality of application programming interface (API) calls on a network between an external card gateway and the organization, wherein the exchanging comprises:

issuing, over the network using the layer and a first set of the plurality of API calls, the card identifier and the one or more valid card identifiers to the organization via the network, such that the card identifier is not distinguishable by the organization from the one or more valid card identifiers;

listening, from the external card gateway using a second set of the plurality of API calls exchanged between the layer and the online transaction processor, for the transaction processing request having the card identifier;

receiving, by the layer from a card processing device based on the listening, the payment request using the alphanumeric card identifier for the organization utilizing the online transaction processer;

performing a database lookup for the alphanumeric card identifier from the data structure stored by a card identifier database for the online transaction processor;

determining that the alphanumeric card identifier is marked for the generation of the one or more alerts;

declining, via one or more second API calls exchanged between the external card gateway the online transaction processor, the payment request, wherein the declining causes a first notification of the declining to be displayed on the card processing device by the card processing gateway;

generating an alert based on determining that the alphanumeric card identifier is marked for the generation of the alert, wherein the alert indicates that the alphanumeric card identifier was used in the payment request; and outputting, during processing of the payment request, the alert to the organization.

20. The non-transitory machine-readable medium of claim 19, wherein the issuing comprises:

receiving a request for the alphanumeric card identifier from the organization, wherein the request identifies data for the one or more alerts and an electronic communication channel;

generating the alphanumeric card identifier based on a request for the alphanumeric card identifier from the organization, wherein the request identifies data for the one or more alerts and an electronic communication channel; and transmitting the alphanumeric card identifier to the organization with the data structure.

* * * * *